(12) United States Patent
Kuwahara et al.

(10) Patent No.: US 11,519,793 B2
(45) Date of Patent: Dec. 6, 2022

(54) SKIN SIMULATION DEVICE, ELECTRONIC APPARATUS EVALUATION METHOD, AND ELECTRONIC APPARATUS EVALUATION SYSTEM

(71) Applicant: SONY CORPORATION, Tokyo (JP)

(72) Inventors: Kosuke Kuwahara, Kanagawa (JP); Yoshio Muraoka, Gunma (JP)

(73) Assignee: SONY CORPORATION, Tokyo (JP)

(*) Notice: Subject to any disclaimer, the term of this patent is extended or adjusted under 35 U.S.C. 154(b) by 397 days.

(21) Appl. No.: 16/495,134

(22) PCT Filed: Jan. 29, 2018

(86) PCT No.: PCT/JP2018/002714
§ 371 (c)(1),
(2) Date: Sep. 18, 2019

(87) PCT Pub. No.: WO2018/179779
PCT Pub. Date: Oct. 4, 2018

(65) Prior Publication Data
US 2020/0011745 A1 Jan. 9, 2020

(30) Foreign Application Priority Data

Mar. 27, 2017 (JP) .............................. JP2017-060941

(51) Int. Cl.
*G01K 13/20* (2021.01)
*G01K 1/143* (2021.01)
(Continued)

(52) U.S. Cl.
CPC ............. *G01K 13/20* (2021.01); *G01K 1/143* (2013.01); *G05D 23/00* (2013.01); *G05D 23/20* (2013.01); *G05D 2201/00* (2013.01)

(58) Field of Classification Search
CPC ........ G01K 13/20; G01K 1/143; G01K 17/06; G05D 23/20
See application file for complete search history.

(56) References Cited

U.S. PATENT DOCUMENTS 5,862,669 A * 1/1999 Davis ...................... F25B 21/02
62/208
9,514,658 B1 * 12/2016 Hart ....................... B29C 70/021
(Continued)

FOREIGN PATENT DOCUMENTS

JP        60-209157 A      10/1985
JP     2001272284 A * 10/2001
(Continued)

OTHER PUBLICATIONS

International Search Report and Written Opinion of PCT Application No. PCT/JP2018/002714, dated Apr. 17, 2018, 08 pages of ISRWO.

*Primary Examiner* — Lionel Nouketcha
(74) *Attorney, Agent, or Firm* — Chip Law Group

(57) ABSTRACT

To provide a skin simulation device, an electronic apparatus evaluation method, and an electronic apparatus evaluation system that make it possible to reproduce the characteristics of a skin temperature of a human body. The skin simulation device according to an embodiment of the present technology includes a sheet-shaped simulated skin member that includes an outer surface and an inner surface, and a subcutaneous unit that includes a subcutaneous temperature detector and a subcutaneous temperature adjusting mechanism. The subcutaneous temperature detector is capable of detecting a temperature of the inner surface. The subcutaneous temperature adjusting mechanism is capable of adjusting the temperature of the inner surface. This makes it possible to adjust the temperature of the inner surface of the (Continued)

simulated skin member (a subcutaneous temperature), and to reproduce the characteristics of a skin temperature of a human body.

18 Claims, 7 Drawing Sheets

(51) Int. Cl.
    *G05D 23/00*      (2006.01)
    *G05D 23/20*      (2006.01)

(56) References Cited

U.S. PATENT DOCUMENTS

2002/0191669 A1    12/2002    Fan et al.
2016/0066839 A1*    3/2016    Ikeda ........................ A61B 5/01
                                                               600/549

FOREIGN PATENT DOCUMENTS

| JP | 3340989 B2 | | 11/2002 |
|----|------------|---|---------|
| JP | 2007-171036 A | | 7/2007 |
| JP | 2007171036 A | * | 7/2007 |
| JP | 2008-089465 A | | 4/2008 |
| JP | 2016-125963 A | | 7/2016 |

\* cited by examiner

SKIN SIMULATION DEVICE, ELECTRONIC APPARATUS EVALUATION METHOD, AND ELECTRONIC APPARATUS EVALUATION SYSTEM

CROSS REFERENCE TO RELATED APPLICATIONS

This application is a U.S. National Phase of International Patent Application No. PCT/JP2018/002714 filed on Jan. 29, 2018, which claims priority benefit of Japanese Patent Application No. JP 2017-060941 filed in the Japan Patent Office on Mar. 27, 2017. Each of the above-referenced applications is hereby incorporated herein by reference in its entirety.

TECHNICAL FIELD

The present technology relates to a skin simulation device, an electronic apparatus evaluation method, and an electronic apparatus evaluation system.

BACKGROUND ART

Conventionally, if an attachable electronic apparatus such as a wearable apparatus generates heat when it is attached, a low temperature burn may be caused due to the attachable electronic apparatus being in contact with the skin for a long time even at a low temperature. Thus, in terms of assurance of safety, there is a need to evaluate how an electronic apparatus that has generated heat affects the skin. However, in terms of ethics and safety, it is not favorable that an evaluation of how an electronic apparatus affects the skin be performed on a human body. Further, a measurement result varies between subjects, which results in being unable to efficiently acquire the characteristics of a skin temperature.

As a device that evaluates how an object in contact with the skin affects the vicinity of the skin, Patent Literature 1 discloses a device that simulates to measure the environment of a tiny space between the human skin and a wound dressing in order to acquire information regarding, for example, the characteristics of temperature and humidity between a dressing involved in wound healing and a wound site. Patent Literature 2 discloses a skin simulation device that is capable of adjusting the surface temperature of a simulated skin in real time in order to evaluate the physical characteristics of fabric used for clothes, such as the heat-retention characteristics and the transpiration characteristics.

CITATION LIST

Patent Literature

Patent Literature 1: Japanese Patent Application Laid-open No. 2008-89465
Patent Literature 2: Japanese Patent Application Laid-open No. 2007-171036

DISCLOSURE OF INVENTION

Technical Problem

However, Patent Literatures 1 and 2 disclose that the surface temperature of the skin can be adjusted to a constant temperature, but do not discuss the characteristics of a skin temperature when an electronic apparatus comes into contact with the skin.

In view of the circumstances described above, it is an object of the present technology to provide a skin simulation device, an electronic apparatus evaluation method, and an electronic apparatus evaluation system that are capable of reproducing the characteristics of a skin temperature of a human body.

Solution to Problem

In order to achieve the object described above, a skin simulation device according to an embodiment of the present technology includes a sheet-shaped simulated skin member that includes an outer surface and an inner surface, and a subcutaneous unit that includes a subcutaneous temperature detector and a subcutaneous temperature adjusting mechanism, the subcutaneous temperature detector being capable of detecting a temperature of the inner surface, the subcutaneous temperature adjusting mechanism being capable of adjusting the temperature of the inner surface.

This makes it possible to adjust a temperature of the inner surface of the simulated skin member (a subcutaneous temperature), and to reproduce the characteristics of a skin temperature of a human body.

The skin simulation device may further include a controller that includes a subcutaneous temperature acquisition section that acquires a temperature of the inner surface detected by the subcutaneous temperature detector, and that controls the subcutaneous temperature adjusting mechanism such that the temperature of the inner surface acquired by the subcutaneous temperature acquisition section is a preset target temperature.

This makes it possible to automatically adjust a subcutaneous temperature, and to reproduce the characteristics of a skin temperature of a human body.

The controller may further include an input temperature acquisition section that acquires the target temperature set by a user.

This makes it possible to reproduce a difference between individuals or depending on the region of skin in a temperature under the skin of a human body, and to reproduce the characteristics of a skin temperature.

The subcutaneous temperature adjusting mechanism may include a heating section for heating the inner surface, and a cooling section for cooling the inner surface.

The heating section may be arranged between the cooling section and the simulated skin member.

The cooling section may include a water-cooling heat sink within which cooling water circulates.

This makes it possible to adjust a subcutaneous temperature with a higher degree of accuracy, and to more accurately reproduce the characteristics of a skin temperature of a human body.

The skin simulation device may further include a holding section that holds the subcutaneous unit.

The holding section may have a shape obtained by reproducing a shape of a human body.

The skin simulation device may include a plurality of the subcutaneous units. The holding section may connect the plurality of the subcutaneous units.

In the skin simulation device, the holding section may include a plurality of fixation portions and a movable portion, the plurality of the subcutaneous units being fixed to each of the plurality of fixation portions, the movable portion connecting the plurality of fixation portions such that a relative position of the plurality of the subcutaneous units is changeable.

This makes it possible to reproduce a surface shape of a human body, and to more accurately reproduce the characteristics of a skin temperature of a human body.

The simulated skin member may be formed by at least one of ethylene propylene rubber, chloroprene rubber, or butyl rubber.

This makes it possible to reproduce the thermal conductivity and a modulus of elasticity of the skin, and to more accurately reproduce the characteristics of a skin temperature of a human body.

In an electronic apparatus evaluation method according to an embodiment of the present technology, a temperature of an inner surface of a simulated skin member is acquired. A temperature of an outer surface of the simulated skin member is measured while adjusting the temperature of the inner surface to a preset target temperature, the outer surface of the simulated skin member being in contact with an electronic apparatus.

This makes it possible to adjust a temperature of the inner surface of the simulated skin member, and to reproduce the characteristics of a skin temperature of a human body. Consequently, it is possible to safely and efficiently evaluate an electronic apparatus.

An electronic apparatus evaluation system according to an embodiment of the present technology includes: a sheet-shaped simulated skin member that includes an outer surface and an inner surface; a subcutaneous unit that includes a subcutaneous temperature detector and a subcutaneous temperature adjusting mechanism, the subcutaneous temperature detector being capable of detecting a temperature of the inner surface, the subcutaneous temperature adjusting mechanism being capable of adjusting the temperature of the inner surface; and a contact-surface-temperature measuring section capable of measuring a temperature of the outer surface in contact with an electronic apparatus.

This makes it possible to adjust a temperature of the inner surface of the simulated skin member, and to reproduce the characteristics of a skin temperature of a human body. Consequently, it is possible to safely and efficiently evaluate an electronic apparatus.

Advantageous Effects of Invention

As described above, the present technology makes it possible to reproduce the characteristics of a skin temperature of a human body. Note that the effect described here is not necessarily limitative and may be any effect described in the present disclosure.

MODE(S) FOR CARRYING OUT THE INVENTION

Embodiments according to the present technology will now be described below with reference to the drawings.

[Skin Simulation Device 10]

Figure 1:
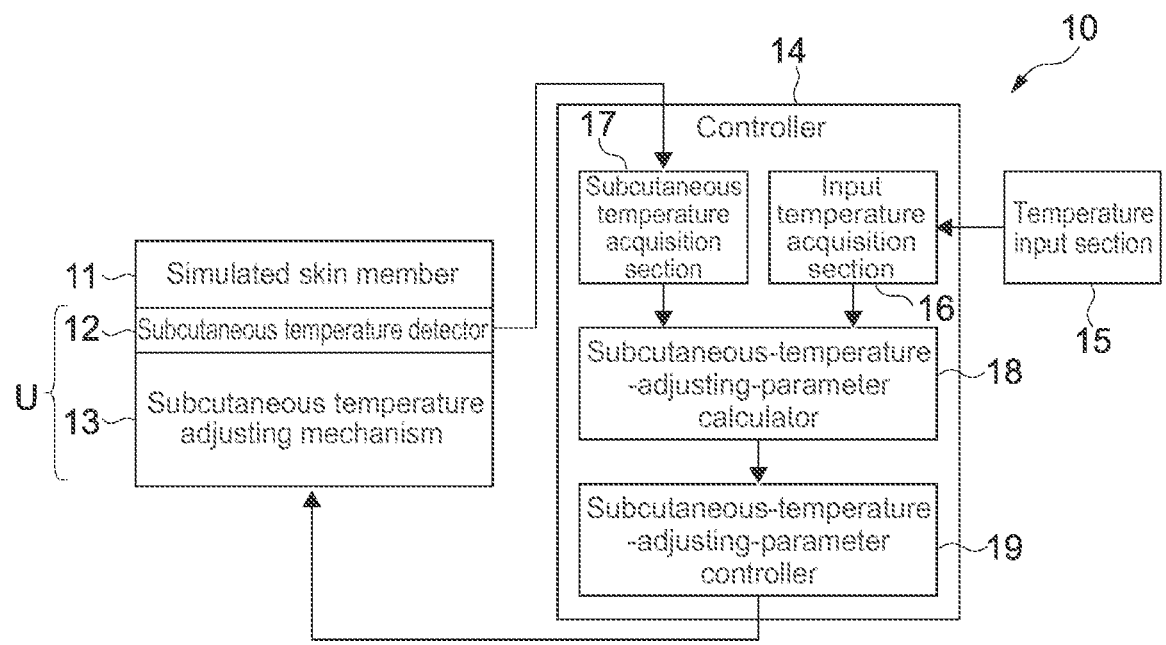
FIG. 1 is a block diagram of a configuration example of a skin simulation device according to an embodiment of the present technology.

FIG. 1 is a block diagram of a configuration example of a skin simulation device 10 according to an embodiment of the present technology.

The skin simulation device 10 includes a simulated skin member 11, a subcutaneous temperature detector 12, a subcutaneous temperature adjusting mechanism 13, a controller 14, and a temperature input section 15. Note that the controller 14 and the temperature input section 15 may be an external configuration, and the skin simulation device 10 may be capable of being connected to the controller 14 and the temperature input section 15. Further, the subcutaneous temperature detector 12 and the subcutaneous temperature adjusting mechanism 13 constitute a subcutaneous unit U.

(Simulated Skin Member 11)

The simulated skin member 11 is a sheet-shaped member that simulates the skin of a human body. The simulated skin member 11 has an outer surface and an inner surface. The outer surface corresponds to a surface of the skin of a human body (a surface that is exposed to an outside environment). The inner surface corresponds to a surface on the side under the skin of a human body. The subcutaneous temperature in the present technology is a temperature under the skin of a human body. The inner surface of the simulated skin member 11 corresponds to a region under the skin, and the temperature of the inner surface of the simulated skin member 11 corresponds to a subcutaneous temperature.

It is favorable that a material that is more similar to the skin of a human body be selected to be a material to form the simulated skin member 11. Specifically, it is favorable that the simulated skin member 11 be an elastic material whose outer surface has a modulus of elasticity comparable to that of the skin of a human body. Further, it is favorable that the simulated skin member 11 have thermal characteristics comparable to those of the skin of a human body. Moreover, for example, the simulated skin member 11 may have a contact pressure similar to that of the skin of a human body, or may have a surface with a slip degree similar to that of the skin of a human body. Such a selection of a material similar to the skin of a human body makes it possible to more accurately reproduce the effects that heat or pressure from the outside has on the skin of a human body.

Specifically, for example, a material having a thermal resistance value close to a thermal resistance value of the skin of a human body is used as the simulated skin member 11 having thermal characteristics close to those of the skin of a human body. The thermal resistance value of the skin is 34.6 [K/W] in a thickness direction when the thermal conductivity of the skin is 0.25 [W/mK], the thickness of the skin is 5.4 [mm], and the area of contact with a human body is 25 mm×25 mm. For example, when an electronic apparatus E described later is brought into contact with the outer surface of the simulated skin member 11, the temperature of the outer surface becomes constant at 45° C. after a sufficient period of time has elapsed, and then the temperature of the outer surface enters a steady state, the thermal resistance value is measured with a timing at which the temperature of the outer surface enters the steady state, being used as a reference. When an accurate measurement is to be performed, an acceptable steady error is set to be within +/−1° C., and the simulated skin member 11 is selected and designed such that the thermal resistance value of the simulated skin member 11 is in a range of 30.3 to 38.8 [K/W]. Further, when a variation between individuals is to be considered, an acceptable steady error is set to be within +/−3° C., and the simulated skin member 11 is selected and designed such that the thermal resistance value of the simulated skin member 11 is in a range of 21.8 to 47.3 [K/W].

The Young's modulus of the skin of a human body is in a range of $4.2 \times 10^5$ [Pa] to $8.5 \times 10^5$ [Pa]. Thus, for example, a soft elastic rubber having a Young's modulus in a range of $1.5 \times 10^6$ [Pa] to $5.0 \times 10^6$ [Pa], or a material having a Young's modulus closer to the Young's modulus of the skin of a human body, is used as an elastic material similar to the skin of a human body. Metallic materials are not suitable for the simulated skin member 11, because they are hard, such as aluminum having a Young's modulus of $7.03 \times 10^{10}$ [Pa] and brass having a Young's modulus of $10.06 \times 10^{10}$ [Pa].

Considering the descriptions above, it is favorable that ethylene propylene rubber, chloroprene rubber, or butyl rubber be used as the simulated skin member 11 having thermal characteristics similar to those of the skin of a human body and having a modulus of elasticity similar to that of the skin of a human body. In particular, it is more favorable that the thickness be 7.8 [mm] when ethylene propylene rubber is used. It is more favorable that the thickness be 5.4 [mm] when chloroprene rubber is used. It is more favorable that the thickness be 2.8 [mm] when butyl rubber is used. The simulated skin member 11 may be one of these materials or a combination of two or more thereof, or may be a combination with a different material. Further, regarding the composition and the thickness of the simulated skin member 11, the simulated skin member 11 can be designed and modified as appropriate according to the acceptable thermal resistance value and the acceptable Young's modulus described above.

Further, the simulated skin member 11 in the skin simulation device 10 may be configured such that the simulated skin member 11 is replaceable as appropriate with respect to the skin simulation device 10. This makes it possible to reproduce a difference between individuals or depending on the region of skin as appropriate, and to evaluate the characteristics of a skin temperature for each case.

(Subcutaneous Temperature Detector 12)

The subcutaneous temperature detector 12 is arranged between the simulated skin member 11 and the subcutaneous temperature adjusting mechanism 13, and has a configuration that makes it possible to detect a subcutaneous temperature. This configuration is not particularly limited, and can be provided using, for example, a thermocouple, a heat flux sensor, or a thermistor. The subcutaneous temperature detected by the subcutaneous temperature detector 12 varies under the influence of the heat transfer from the outer surface of the simulated skin member 11 and the heat transfer from the subcutaneous temperature adjusting mechanism 13 described later. Note that data related to a detected subcutaneous temperature may be transmitted to the controller 14, which will be described later.

(Subcutaneous Temperature Adjusting Mechanism 13)

The subcutaneous temperature adjusting mechanism 13 has a configuration that makes it possible to adjust a subcutaneous temperature detected by the subcutaneous temperature detector 12. The subcutaneous temperature adjusting mechanism 13 is configured such that the subcutaneous temperature adjusting mechanism 13 can reproduce a mechanism of a human body that tries to keep a temperature under the skin constant when, for example, the outside air temperature changes.

Figure 2:
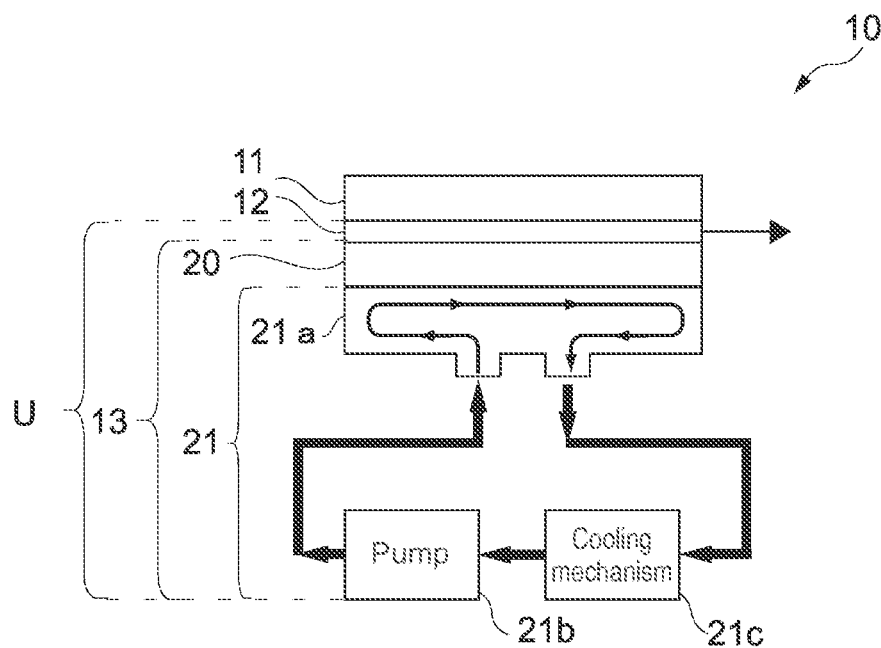
FIG. 2 is a schematic diagram of an example of a specific configuration of a subcutaneous temperature adjusting mechanism of the skin simulation device.

FIG. 2 is a schematic diagram of an example of a specific configuration of the subcutaneous temperature adjusting mechanism 13. The subcutaneous temperature adjusting mechanism 13 includes a heating section 20 and a cooling section 21. This makes it possible to adjust a subcutaneous temperature with a high degree of accuracy, which results in accurately reproducing the characteristics of a skin temperature.

The heating section 20 is arranged under the simulated skin member 11 in FIG. 2. Examples of the heating section 20 include a ceramic heater.

The cooling section 21 is arranged under the heating section 20. The cooling section 21 includes a water-cooling heat sink 21a, a pump 21b, and a cooling mechanism 21c. Due to this configuration of the cooling section 21, a subcutaneous temperature is adjusted with a higher degree of accuracy.

The water-cooling heat sink 21a is arranged under the heating section 20 such that the water-cooling heat sink 21a comes into contact with the heating section 20. In the water-cooling heat sink 21a, a region under the skin is cooled by a heat exchange with cooling water flowing within the water-cooling heat sink 21a.

The pump 21b has a configuration that circulates cooling water such that the flow rate of the cooling water is adjustable. The heat discharge is adjusted due to a change in the flow rate of cooling water.

The cooling mechanism 21c is, for example, a fan or a radiator, and is not particularly limited as long as the cooling mechanism 21c is capable of performing cooling to remove the heat absorbed by cooling water.

In a human body, a temperature under the skin of the human body is kept constant by dilating and constricting blood vessels and changing the rate of blood flow. In the cooling section 21, the heat discharge is controlled and the subcutaneous temperature is kept constant by changing the flow rate of cooling water. Thus, in the present technology, a mechanism similar to that of a human body is reproduced. This makes it possible to reproduce a temperature under the skin of a human body that differs between individuals or depending on the region of skin, and to more accurately and more easily reproduce the characteristics of a skin temperature.

The configuration of the cooling section 21 is not limited to the configuration described above as long as it is a configuration that makes it possible to cool a region under the skin, and the cooling section 21 may have a configuration, for example, using a Peltier element.

The subcutaneous temperature adjusting mechanism 13 may include a highly thermally conductive heat spreading plate such that it is possible to efficiently heat or cool a region under the skin. For example, a copper foil tape or an aluminum plate may be used as the heat spreading plate. The heat spreading plate may be arranged on the heating section 20, or may be arranged between the heating section 20 and the cooling section 21.

The subcutaneous temperature adjusting mechanism 13 may include an adhesion portion such as an adhesive used to bond respective components. The adhesion portion may be provided, for example, between the heating section 20 and the heat spreading plate described above, and is provided as appropriate when necessary. It is favorable that a highly thermally conductive material be used as an adhesion portion.

Note that, in FIG. 2, the simulated skin member 11, the subcutaneous temperature detector 12, the heating section 20, and the cooling section 21 have the same planar shape, but they are not limited to such a configuration. For example, the subcutaneous temperature adjusting mechanism 13 may be larger than the simulated skin member 11, and may extend beyond the simulated skin member 11.

(Temperature Input Section 15)

The temperature input section 15 is configured such that a target temperature can be input by a user using the temperature input section 15. The temperature input section 15 is, for example, a keyboard or a touch panel, and is not particularly limited. The target temperature is determined according to a temperature under the skin of an actual human body. The temperature under the skin of a human body is, for example, 36.9° C. at a depth of 5.4 mm below the skin. Since there is a difference between individuals or depending on the region of skin in a temperature under the skin of a human body, a target temperature according to a case is input. This makes it possible to reproduce a temperature under the skin of a human body for each individual. Note that, when the skin simulation device 10 is operated according to a preset target temperature, the skin simulation device 10 does not have to include the temperature input section 15.

(Controller 14)

The controller 14 adjusts the subcutaneous temperature adjusting mechanism 13 according to a subcutaneous temperature detected by the subcutaneous temperature detector 12 and a target temperature input by the temperature input section 15. The controller 14 includes an input temperature acquisition section 16, a subcutaneous temperature acquisition section 17, a subcutaneous-temperature-adjusting-parameter calculator 18, and a subcutaneous-temperature-adjusting-parameter controller 19.

The input temperature acquisition section 16 acquires a target temperature input by the temperature input section 15.

The subcutaneous temperature acquisition section 17 acquires a subcutaneous temperature detected by the subcutaneous temperature detector 12.

The subcutaneous-temperature-adjusting-parameter calculator 18 calculates a subcutaneous temperature adjusting parameter such that a subcutaneous temperature is a target temperature. The subcutaneous temperature adjusting parameter is a parameter used to adjust the subcutaneous temperature adjusting mechanism 13 such that for example, the steady state deviation of a detected subcutaneous temperature from a target temperature is 0° C. Specifically, examples of the subcutaneous temperature adjusting parameter include an output voltage with respect to the heating section 20, a flow rate of cooling water, and an amount of power for adjusting the flow rate. Due to a subcutaneous temperature adjusting parameter being adjusted, a temperature under the skin of a human body that differs between individuals or depending on the region of skin, is reproduced without replacement of the simulated skin member 11, and this makes it possible to efficiently acquire the characteristics of a skin temperature.

The subcutaneous-temperature-adjusting-parameter controller 19 controls the subcutaneous temperature adjusting mechanism 13 using a subcutaneous temperature adjusting parameter calculated by the subcutaneous-temperature-adjusting-parameter calculator 18. This keeps a subcutaneous temperature detected by the subcutaneous temperature detector 12 constant. Accordingly, the subcutaneous temperature is automatically adjusted.

[Subcutaneous Temperature Control Method]

Figure 3:
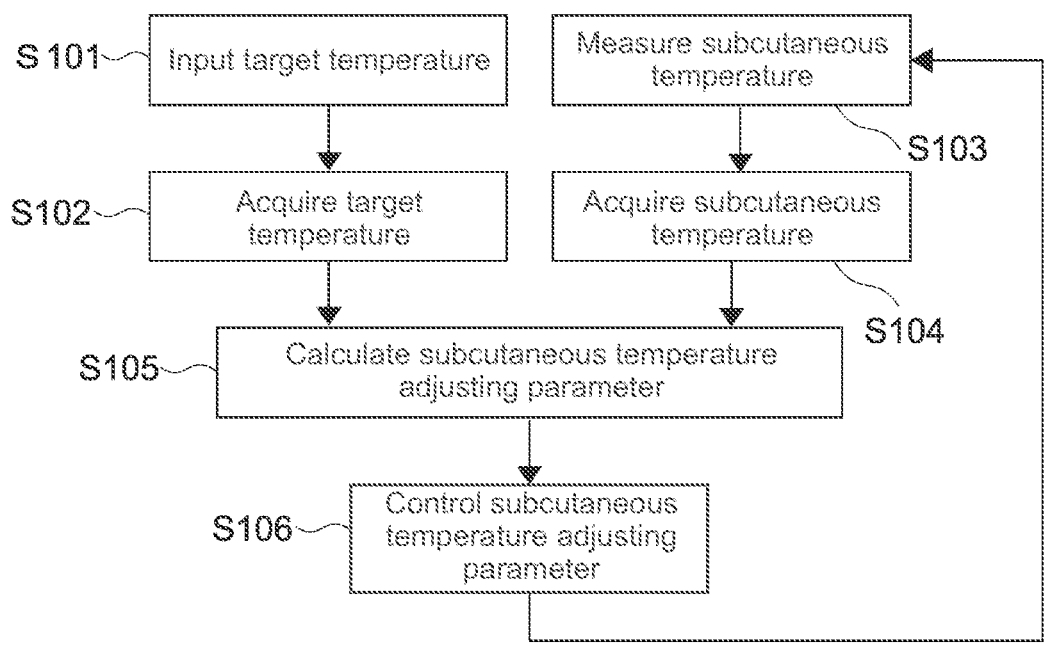
FIG. 3 is a flowchart illustrating a subcutaneous temperature control method using the skin simulation device.

FIG. 3 is a flowchart illustrating a subcutaneous temperature control method of the skin simulation device 10.

In S101, a user inputs a target temperature using the temperature input section 15. For example, 36.9° C., which is a temperature at a depth of 5.4 mm below the skin of a human body, is set to be the target temperature.

In S102, the input temperature acquisition section 16 of the controller 14 acquires the target temperature input by the temperature input section 15.

In S103, the subcutaneous temperature detector 12 detects a subcutaneous temperature.

In S104, the subcutaneous temperature acquisition section 17 of the controller 14 acquires the subcutaneous temperature detected by the subcutaneous temperature detector 12. Note that the order of S104 and S102 is not particularly limited.

In S105, the subcutaneous-temperature-adjusting-parameter calculator 18 calculates a subcutaneous temperature adjusting parameter according to the input target temperature and the detected subcutaneous temperature.

In S106, the subcutaneous-temperature-adjusting-parameter controller 19 controls the subcutaneous temperature adjusting mechanism 13 using the subcutaneous temperature adjusting parameter.

After this, the process returns to S103 and repeats S103 to S106.

This keeps the subcutaneous temperature at a target temperature, which makes it possible to reproduce a temperature under the skin of a human body.

[Electronic Apparatus Evaluation System 100]

Figure 4:
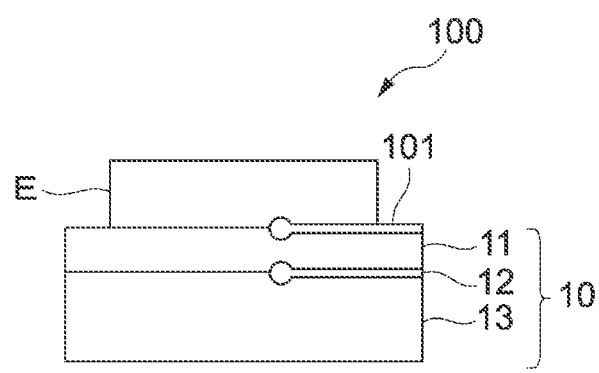
FIG. 4 is a block diagram of an example of a configuration of an electronic apparatus evaluation system using the skin simulation device.

FIG. 4 is a block diagram of an example of a configuration of an electronic apparatus evaluation system 100 according to the embodiment of the present technology. The electronic apparatus evaluation system 100 of the present invention is used to evaluate the electronic apparatus E. The electronic apparatus evaluation system 100 includes the skin simulation device 10 and a contact-surface-temperature measuring section 101.

The electronic apparatus E is not particularly limited as long as it generates heat. Examples of the electronic apparatus E include a portable electronic apparatus such as a smartphone and an attachable electronic apparatus such as a head-mounted display. The electronic apparatus E is arranged such that the electronic apparatus E comes into contact with the simulated skin member 11. Here, the state in which the electronic apparatus E is in contact with the simulated skin member 11 may be, for example, a state in which, for example, clothes are situated between the electronic apparatus E and the simulated skin member 11, or may be a state in which the electronic apparatus E is situated close to the simulated skin member 11 to such an extent that the simulated skin member 11 is affected by heat from the electronic apparatus E.

Examples of the contact-surface-temperature measuring section 101 include a thermocouple, a thermistor, and a thermometer, and the contact-surface-temperature measuring section 101 is not particularly limited as long as the contact-surface-temperature measuring section 101 has a configuration that makes it possible to measure a temperature of a surface of contact between the simulated skin member 11 and the electronic apparatus E (the outer surface of the simulated skin member 11). It is possible to acquire the characteristics of a skin temperature of a human body using a temperature measured by the contact-surface-temperature measuring section 101, and to evaluate the electronic apparatus E.

The electronic apparatus evaluation system 100 may further include a recording section that is capable of recording therein data related to a temperature measured by the contact-surface-temperature measuring section 101. Moreover, the electronic apparatus evaluation system 100 may further include an output section that is capable of outputting data.

[Electronic Apparatus Evaluation Method]

Figure 5:
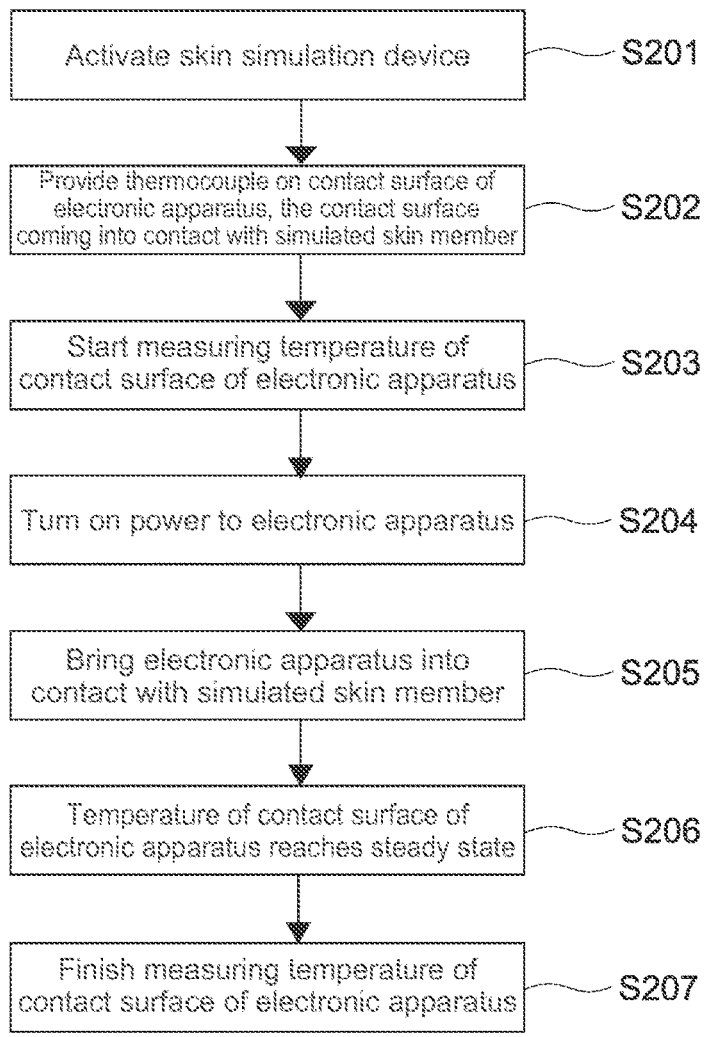
FIG. 5 is a flowchart illustrating an example of an electronic apparatus evaluation method using the skin simulation device.

FIG. 5 is a flowchart illustrating an example of an electronic apparatus evaluation method using the skin simulation device 10.

In S201, the skin simulation device 10 is activated.

In S202, as the contact-surface-temperature measuring section 101, a thermocouple is provided on a contact surface of the electronic apparatus E, the contact surface coming into contact with the simulated skin member 11. Note that the order of performing the operations of S201 and S202 is not particularly limited.

In S203, a temperature of the contact surface of the electronic apparatus E starts to be measured by the contact-surface-temperature measuring section 101 provided on the electronic apparatus E. In order to reproduce, when the measurement is performed, a state in which the electronic apparatus E is in use, the temperature may start to be measured with the electronic apparatus E being suspended in the air using, for example, a string such that the electronic apparatus E has no other contact surfaces.

In S204, the power to the electronic apparatus E is turned on. The turning on the power includes returning from a sleep state. Further, operations for executing an operation of an apparatus, such as activating application software, setting up the application software, and executing an operation of the application software, are performed as the turning on the power, the operation of an apparatus being used as a measurement reference. Further, for example, the power may be turned on after maximum load conditions when the temperature of the electronic apparatus E increases, are set, in order to evaluate the risk of low temperature burn. Note that the order of S203 and S204 is not particularly limited.

In S205, the electronic apparatus E is brought into contact with the simulated skin member 11. In a state in which the electronic apparatus E is in contact with the simulated skin member 11, the electronic apparatus E is manually or automatically fixed using, for example, a clamp. The contact pressure upon performing the fixing may be changed as appropriate according to the status of use of the electronic apparatus E.

In S206, after a specified period of time has elapsed, a temperature of the contact surface of the electronic apparatus E (the outer surface of the simulated skin member 11) becomes almost constant due to the heat transfer from the electronic apparatus E and the heat transfer from the subcutaneous temperature adjusting mechanism 13, and reaches a steady state.

In S207, the measurement of the temperature of the contact surface of the electronic apparatus E is finished.

Figure 6:
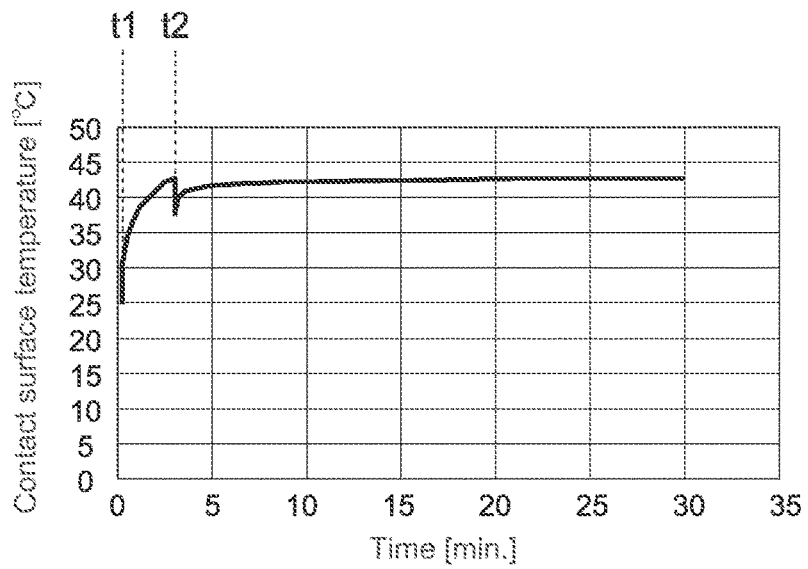
FIG. 6 is a graph illustrating an example of measurement data obtained by the electronic apparatus evaluation method.

FIG. 6 is a graph illustrating an example of measurement data obtained by the electronic apparatus evaluation method. The graph illustrates a result of acquiring the characteristics of a skin temperature, where the horizontal axis represents a time [min.] and the vertical axis represents a temperature of a contact surface [° C.]. Butyl rubber is used as the simulated skin member 11. A smartphone is used as the electronic apparatus E.

The power to the electronic apparatus E is turned on at a time t1 (S204). This causes heat to be generated from the inside of the electronic apparatus E, which results in increasing the temperature of the surface of the electronic apparatus E.

At a time t2, the electronic apparatus E is brought into contact with the skin simulation device 10 (S205). This causes the heat from the electronic apparatus E to be transferred under the skin, and a temperature of the contact surface is temporarily decreased. After that, the temperature of the contact surface increases gradually, and reaches a steady state after a specified period of time has elapsed.

In the electronic apparatus evaluation method according to the present embodiment, the electronic apparatus E can be evaluated using a temperature of a contact surface that has reached a steady state. In other words, it is possible to evaluate whether the temperature of a contact surface that has reached a steady state exceeds a reference value. A value according to the risk of low temperature burn is set to be the reference value. This makes it possible to predict, at the time of performing a thermal design of the electronic apparatus E, the characteristics of a temperature inside the electronic apparatus E when the electronic apparatus E comes into contact with a human body.

Further, the attachment of the electronic apparatus E having generated heat to the skin of a human body is essentially to be avoided in terms of safety, and the present technology makes it possible to non-invasively evaluate the electronic apparatus E in contact. Moreover, it also becomes possible to perform tests, such as an experiment in a high-temperature environment and a heat cycle test, that are likely to be deeply harmful to a human body. This makes it possible to evaluate not only the risk of low temperature burn but also the risk of burn at a high temperature.

Modification of Present Embodiment

Although the embodiment of the present invention has been described above, it is needless to say that the present invention is not limited only to the embodiment described above and various modifications may be made without departing from the gist of the present invention. For example, the skin simulation device 10 may include a holding section 30. Configuration Examples 1 to 5 of the skin simulation device 10 including the holding section 30, are described using FIGS. 7A, 7B, 8A, 8B, 9, 10A and 10B.

Figure 7A:
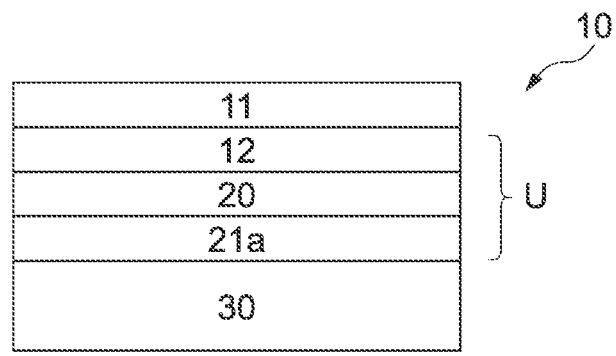
FIG. 7A is a schematic diagram of Configuration Example 1 of the skin simulation device including a holding section.

FIG. 7A is a schematic diagram of Configuration Example 1 of the skin simulation device 10 including the holding section 30. In FIG. 7A, the skin simulation device 10 further includes the holding section 30 that holds the subcutaneous unit U by the subcutaneous unit U being fixed to the holding section 30.

The method for fixing the subcutaneous unit U to the holding section 30 is not limited to a specific method. For example, the holding section 30 may be configured such that the holding section 30 can fit the subcutaneous unit U. Further, the holding section 30 may be configured such that the holding section 30 can fix the subcutaneous unit U using, for example, a clamp, a belt, a tape, or clothes.

Further, the holding section 30 may double as the heat spreading plate described above.

Figure 7B:
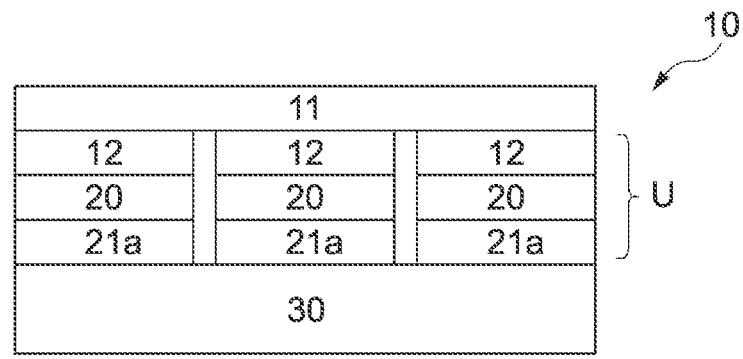
FIG. 7B is a schematic diagram of Configuration Example 2 of the skin simulation device including the holding section.

FIG. 7B is a schematic diagram of Configuration Example 2 of the skin simulation device 10 including the holding section 30. In Configuration Example 2, a plurality of subcutaneous units U is held with respect to a single holding section 30. In this configuration, it is possible to evaluate the characteristics of a skin temperature at a plurality of positions of the simulated skin member 11.

As illustrated in FIG. 7B, the simulated skin member 11 may be used as a shared member for the plurality of subcutaneous units U, or may be divided to be used for each subcutaneous unit U. Further, a different target temperature may be set for each subcutaneous unit U.

Figure 8A:
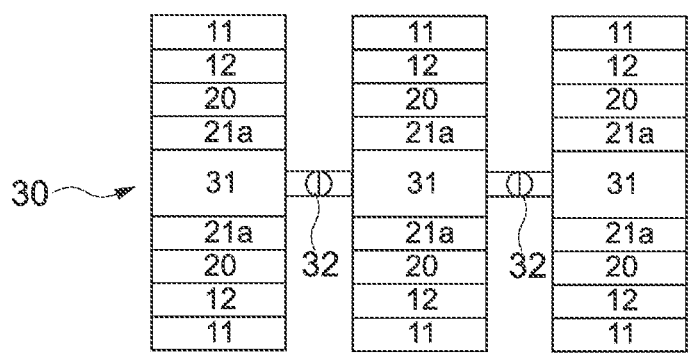
FIG. 8A is a schematic diagram of Configuration Example 3 of the skin simulation device including the holding section.
Figure 8B:
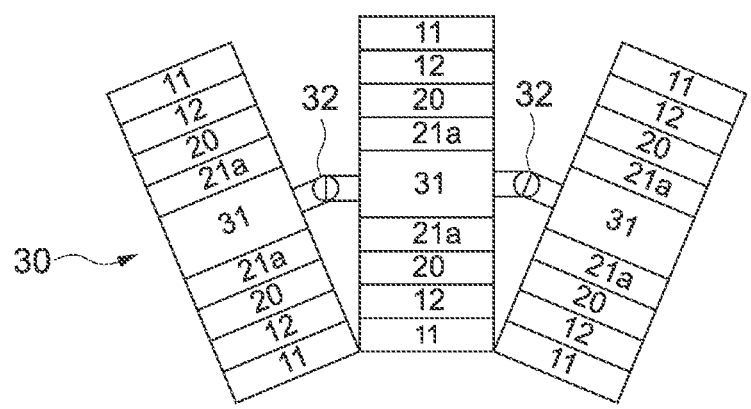
FIG. 8B is a schematic diagram of Configuration Example 3 of the skin simulation device including the holding section.

FIG. 8A and FIG. 8B are schematic diagrams of Configuration Example 3 of the skin simulation device 10 including the holding section 30. The holding section 30 includes a plurality of fixation portions 31 and a movable portion 32. A plurality of subcutaneous units U is fixed to each of the plurality of fixation portions 31. The movable portion 32 connects the plurality of fixation portions 31 such that the relative position of the plurality of subcutaneous units U is changeable. In other words, the relative position of the plurality of subcutaneous units U fixed to the fixation portion 31 is changed by the fixation portion 31 moving with the movable portion 32 being used as a fulcrum.

In FIG. 8A and FIG. 8B, the simulated skin member 11 is arranged for each subcutaneous unit U. In FIG. 8A, the simulated skin members 11 form a flat surface. In FIG. 8B, the simulated skin members 11 form a convex curved surface in an upper portion and a concave curved surface in a lower portion. This results in reproducing a curved surface of the skin of a human body. For example, this results in reproducing the form of an articular portion of a human body, such as a state in which the finger or the arm is bent, as illustrated in FIG. 8B. Further, the arrangement of the plurality of subcutaneous units U fixed to the fixation portion 31 is changeable as appropriate according to a human body's shape desired to be reproduced.

Figure 9:
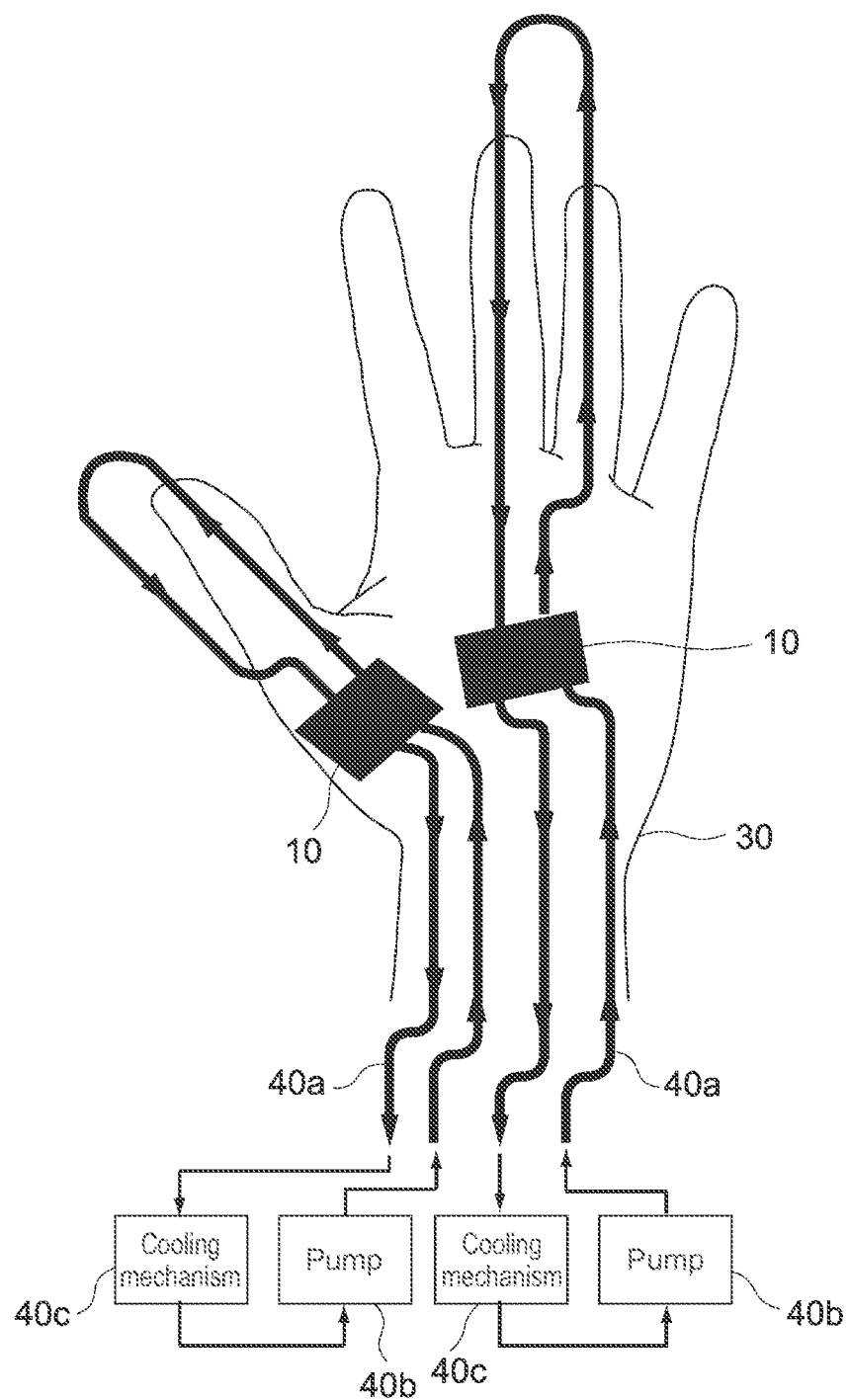
FIG. 9 is a schematic diagram of Configuration Example 4 of the skin simulation device including the holding section obtained by reproducing the shape of the hand in a human body.

FIG. 9 is a schematic diagram of Configuration Example 4 of the skin simulation device 10 including the holding section 30 obtained by reproducing the shape of the hand in a human body.

In FIG. 9, the holding section 30 is a reproduction of the shape of the hand in a human body. The skin simulation device 10 is embedded in, for example, a concave portion provided in the holding section 30. The skin simulation device 10 can be provided at any position, and a plurality of skin simulation devices 10 may be provided. It is possible to only acquire, as appropriate, the characteristics of a skin temperature of a region whose characteristics of a skin temperature are necessary, by changing, according to the status of use of the electronic apparatus E, the position at which the skin simulation device 10 is provided. Thus, it is possible to evaluate the electronic apparatus E with a simple configuration, compared to the case of providing the skin simulation device 10 in an entire surface of the holding section 30. Note that the shape of the holding section 30 may be formed using, for example, a 3D printer.

In Configuration Example 4, the cooling section 21 includes a tube 40a, a pump 40b, and a cooling mechanism 40c. The tube 40a circulates cooling water through the skin simulation device 10, the pump 40b, and the cooling mechanism 40c. Like blood vessels extending throughout under the skin, the tube 40a is arranged to spread over the inside of the holding section 30. This results in more accurately reproducing the mechanism of a human body.

Figure 10A:
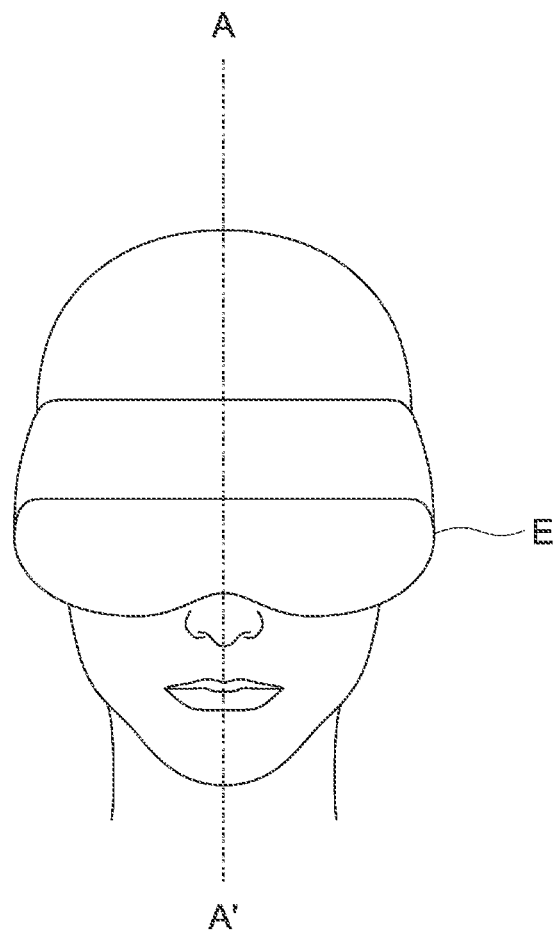
FIG. 10A is a schematic diagram of Configuration Example 5 of the skin simulation device including the holding section obtained by reproducing the shape of the head in a human body.
Figure 10B:
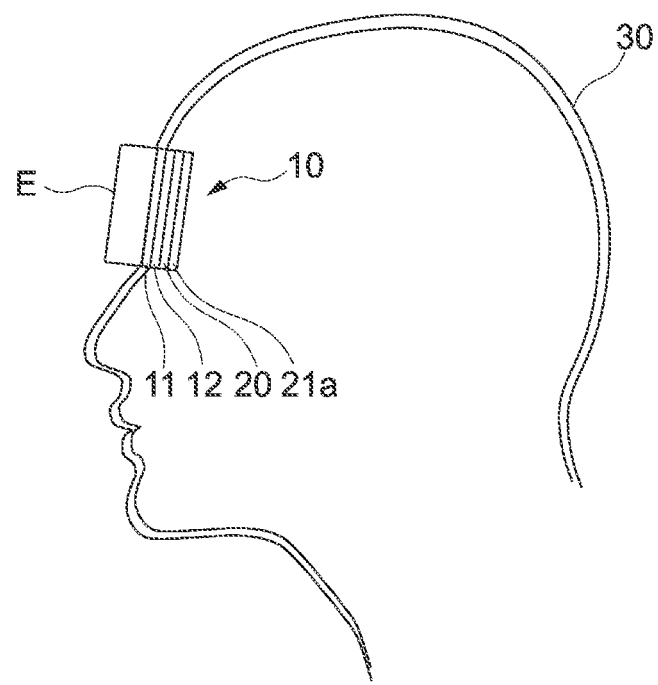
FIG. 10B is a cross-sectional view of the skin simulation device taken along the line A-A'.

FIG. 10A is a schematic diagram of Configuration Example 5 of the skin simulation device 10 including the holding section 30 obtained by reproducing the shape of the head in a human body. FIG. 10B is a cross-sectional view of the skin simulation device 10 taken along the line A-A'.

In Configuration Example 5, the characteristics of a skin temperature when a head-mounted display is attached, is evaluated. The position to provide the skin simulation device 10 is typically a position at which the skin simulation device 10 comes into contact with the head-mounted display, but is not limited to this position. For example, in the case of a region in, for example, the head whose large portion is exposed to the air, due to a fanned heat from the surface of a body, a low temperature burn may be caused even at a position with which the head-mounted display does not directly come into contact. Thus, the skin simulation device 10 may be provided at a position with which the head-mounted display does not come into contact, and the characteristics of a skin temperature may be evaluated. Regarding the position to provide the skin simulation device 10, the skin simulation device 10 may be provided, for example, on the forehead or in the back of the head. Accordingly, it becomes possible to evaluate the risk of low temperature burn in a state close to an actual status of use.

OTHER EMBODIMENTS

At least two of the features of the present technology described above can also be combined. In other words, various features described in the respective embodiments may be optionally combined regardless of the embodiments. Further, the various effects described above are not limitative but are merely illustrative, and other effects may be provided.

Note that the present technology may also take the following configurations.

(1) A skin simulation device including:
  a sheet-shaped simulated skin member that includes an outer surface and an inner surface; and
  a subcutaneous unit that includes a subcutaneous temperature detector and a subcutaneous temperature adjusting mechanism, the subcutaneous temperature detector being capable of detecting a temperature of the inner surface, the subcutaneous temperature adjusting mechanism being capable of adjusting the temperature of the inner surface.

(2) The skin simulation device according to (1), further including
  a controller that
    includes a subcutaneous temperature acquisition section that acquires a temperature of the inner surface detected by the subcutaneous temperature detector, and
    controls the subcutaneous temperature adjusting mechanism such that the temperature of the inner surface acquired by the subcutaneous temperature acquisition section is a preset target temperature.

(3) The skin simulation device according to (2), in which
  the controller further includes an input temperature acquisition section that acquires the target temperature set by a user.

(4) The skin simulation device according to any one of (1) to (3), in which the subcutaneous temperature adjusting mechanism includes a heating section for heating the inner surface, and a cooling section for cooling the inner surface.

(5) The skin simulation device according to (4), in which
the heating section is arranged between the cooling section and the simulated skin member.

(6) The skin simulation device according to (5), in which
the cooling section includes a water-cooling heat sink within which cooling water circulates.

(7) The skin simulation device according to any one of (1) to (6), further including
a holding section that holds the subcutaneous unit.

(8) The skin simulation device according to (7), in which
the holding section has a shape obtained by reproducing a shape of a human body.

(9) The skin simulation device according to (7) or (8), in which
the skin simulation device includes a plurality of the subcutaneous units, and
the holding section connects the plurality of the subcutaneous units.

(10) The skin simulation device according to (9), in which
the holding section includes a plurality of fixation portions and a movable portion, the plurality of the subcutaneous units being fixed to each of the plurality of fixation portions, the movable portion connecting the plurality of fixation portions such that a relative position of the plurality of the subcutaneous units is changeable.

(11) The skin simulation device according to any one of (1) to (10), in which
the simulated skin member is formed by at least one of ethylene propylene rubber, chloroprene rubber, or butyl rubber.

(12) An electronic apparatus evaluation method including:
acquiring a temperature of an inner surface of a simulated skin member; and
measuring a temperature of an outer surface of the simulated skin member while adjusting the temperature of the inner surface to a preset target temperature, the outer surface of the simulated skin member being in contact with an electronic apparatus.

(13) An electronic apparatus evaluation system including:
a sheet-shaped simulated skin member that includes an outer surface and an inner surface;
a subcutaneous unit that includes a subcutaneous temperature detector and a subcutaneous temperature adjusting mechanism, the subcutaneous temperature detector being capable of detecting a temperature of the inner surface, the subcutaneous temperature adjusting mechanism being capable of adjusting the temperature of the inner surface; and
a contact-surface-temperature measuring section capable of measuring a temperature of the outer surface in contact with an electronic apparatus.

REFERENCE SIGNS LIST 10 skin simulation device
11 simulated skin member
12 subcutaneous temperature detector
13 subcutaneous temperature adjusting mechanism
14 controller
15 temperature input section
16 input temperature acquisition section
17 subcutaneous temperature acquisition section
18 subcutaneous-temperature-adjusting-parameter calculator
19 subcutaneous-temperature-adjusting-parameter controller
20 heating section
21 cooling section
21a water-cooling heat sink
21b pump
21c cooling mechanism
30 holding section
31 fixation portion
32 movable portion
100 electronic apparatus evaluation system
101 contact-surface-temperature measuring section
U subcutaneous unit
E electronic apparatus

The invention claimed is:

1. A skin simulation device comprising:
a sheet-shaped simulated skin member that includes an outer surface and an inner surface; and
a plurality of subcutaneous units, each subcutaneous unit of the plurality of subcutaneous units includes a subcutaneous temperature detector and a subcutaneous temperature adjusting mechanism, wherein the subcutaneous temperature detector is configured to detect a temperature of the inner surface, and wherein the subcutaneous temperature adjusting mechanism is configured to adjust the temperature of the inner surface, and wherein a relative position of the plurality of subcutaneous units is changeable.

2. The skin simulation device according to claim 1, further comprising
a controller that includes a subcutaneous temperature acquisition section that is configured to:
acquire the temperature of the inner surface detected by the subcutaneous temperature detector, and
control the subcutaneous temperature adjusting mechanism such that the temperature of the inner surface acquired by the subcutaneous temperature acquisition section is a preset target temperature.

3. The skin simulation device according to claim 2, wherein
the controller further includes an input temperature acquisition section that is configured to acquire the preset target temperature.

4. The skin simulation device according to claim 1, wherein
the subcutaneous temperature adjusting mechanism includes a heating section that is configured to heat the inner surface, and a cooling section that is configured to cool the inner surface.

5. The skin simulation device according to claim 4, wherein
the heating section is arranged between the cooling section and the sheet-shaped simulated skin member.

6. The skin simulation device according to claim 5, wherein
the cooling section includes a water-cooling heat sink within which cooling water circulates.

7. The skin simulation device according to claim 6, wherein
the water-cooling heat sink is arranged under the heating section such that the water-cooling heat sink comes into contact with the heating section.

8. The skin simulation device according to claim 4, wherein
the subcutaneous temperature detector, the heating section, and the cooling section have a same planar shape.

9. The skin simulation device according to claim 1, further comprising
a holding section that holds the plurality of subcutaneous units.

10. The skin simulation device according to claim 9, wherein
the holding section has a shape obtained by reproduction of a shape of a human body.

11. The skin simulation device according to claim 9, wherein the plurality of subcutaneous units is coupled to the inner surface at a plurality of positions of the inner surface, respectively, and wherein the holding section connects the plurality of subcutaneous units.

12. The skin simulation device according to claim 11, wherein the holding section includes a plurality of fixation portions and a movable portion, wherein the plurality of subcutaneous units is fixed to the plurality of fixation portions, respectively, and the movable portion connects the plurality of fixation portions such that the relative position of the plurality of subcutaneous units is changeable.

13. The skin simulation device according to claim 11, wherein
a plurality of subcutaneous temperature detectors in the plurality of subcutaneous units is configured to detect the temperature at the plurality of positions of the inner surface, respectively.

14. The skin simulation device according to claim 11, wherein
a plurality of subcutaneous temperature adjusting mechanisms in the plurality of subcutaneous units is configured to adjust the temperature at the plurality of positions of the inner surface to different preset target temperatures, respectively.

15. The skin simulation device according to claim 1, wherein
the sheet-shaped simulated skin member is formed by at least one of ethylene propylene rubber, chloroprene rubber, or butyl rubber.

16. The skin simulation device according to claim 1, wherein
the subcutaneous temperature detector is in contact with the inner surface.

17. An electronic apparatus evaluation method comprising:
acquiring a temperature of an inner surface of a simulated skin member; and
measuring a temperature of an outer surface of the simulated skin member while adjusting the temperature of the inner surface to a preset target temperature, the outer surface of the simulated skin member being in contact with an electronic apparatus.

18. An electronic apparatus evaluation system comprising:
a sheet-shaped simulated skin member that includes an outer surface and an inner surface;
a plurality of subcutaneous units, each subcutaneous unit of the plurality of subcutaneous units includes a subcutaneous temperature detector and a subcutaneous temperature adjusting mechanism, wherein the subcutaneous temperature detector is configured to detect a temperature of the inner surface, and wherein the subcutaneous temperature adjusting mechanism is configured to adjust the temperature of the inner surface;
a holding section that includes a plurality of fixation portions and a movable portion,
wherein the plurality of subcutaneous units is fixed to the plurality of fixation portions, respectively, and the movable portion connects the plurality of fixation portions such that a relative position of the plurality of subcutaneous units is changeable; and
a contact-surface-temperature measuring section that is configured to measure a temperature of the outer surface such that the outer surface is in contact with an electronic apparatus.

* * * * *